United States Patent [19]
Gokhman

[11] Patent Number: 5,441,384
[45] Date of Patent: Aug. 15, 1995

[54] HYDRAULIC TURBINE AND GUIDE GATE APPARATUS AND RUNNER APPARATUS THEREFOR

[75] Inventor: Alexander Gokhman, San Francisco, Calif.

[73] Assignee: Hydro West Group, Inc., Bellevue, Wash.

[21] Appl. No.: 138,150

[22] Filed: Oct. 15, 1993

[51] Int. Cl.$^6$ .................................................. F03B 3/18
[52] U.S. Cl. ................................. 415/161; 415/163; 415/164; 415/148
[58] Field of Search ............... 415/148, 150, 151, 159, 415/160, 161, 162, 163, 164, 165, 166

[56] References Cited

U.S. PATENT DOCUMENTS

| | | | |
|---|---|---|---|
| 1,929,099 | 10/1933 | Moody | 415/164 |
| 2,972,469 | 2/1961 | Mayo, Jr. | 415/163 |
| 3,169,747 | 2/1965 | Seymour | 415/159 |
| 3,973,869 | 8/1976 | Doll . | |
| 4,120,602 | 10/1978 | Megnint . | |
| 4,203,703 | 5/1980 | Koeller . | |
| 4,575,307 | 3/1986 | Shinohara . | |
| 4,867,636 | 9/1989 | Sauron . | |

FOREIGN PATENT DOCUMENTS

0025341 2/1979 Japan ................................ 415/160
0182361 9/1985 Japan ................................ 415/163

Primary Examiner—Edward K. Look
Assistant Examiner—Christopher Verdier
Attorney, Agent, or Firm—Graybeal Jackson Haley & Johnson

[57] ABSTRACT

Wicket gates and axial flow or mixed flow runner blades for a hydraulic turbine with the wicket gates arranged in a generally circular array around a central axis and with the gates pivotal about pivot axes parallel to the central axis. Each of the wicket gates is provided with a trailing edge shaped to present a discharge angle which varies from a small discharge angle at the bottom of the gate to a large discharge angle at the top of the gate. The discharge angle at any point along the length of the trailing edge is preselected such that water flow having a known radial velocity vector at the trailing edge will have a constant circumferential velocity vector along the length of the trailing edge. The shape of the runner blades is related to the shape of the wicket gates such that the whirl value for the fluid flow exiting the runner blades is between about zero and a value that is less than the change in whirl from the inlet to the exit of the runner apparatus formed by the runner blades.

23 Claims, 9 Drawing Sheets

HYDRAULIC TURBINE AND GUIDE GATE APPARATUS AND RUNNER APPARATUS THEREFOR

BACKGROUND OF THE INVENTION

This invention relates to reaction hydraulic turbines. More specifically, this invention relates to reaction hydraulic turbines comprising a radial intake consisting of a spiral casing with stay vanes, a radial guide gate apparatus, and either a mixed-flow runner or an axial-flow runner.

In the prior art the reaction hydraulic turbines with radial intake and with either mixed-flow runner (Francis turbines) or axial-flow runner (Kaplan and propeller turbines) are commonly provided with a radial guide gate apparatus. The radial guide gate apparatus comprises a plurality of pivotal radial wicket gates whose pivots are parallel to the turbine axis. The radial guide gate apparatus regulates the flow of the water to the turbine runner and closes water passages when the turbine must be stopped. The runner blades must have a geometric shape that corresponds to the flow conditions at the runner inlet and exit in order to provide the requisite power at maximum efficiency. An example of such a Kaplan turbine with a radial intake is shown in U.S. Pat. No. 4,203,703.

Prior art wicket gates are cylindrical, i.e., are circular cylinders. The term "cylinder" is used herein and in the following disclosure in a strict mathematical sense to mean a three-dimensional geometric shape defined by a plurality of parallel lines. A cylinder having a constant radius cross section (which is commonly referred to simply as cylindrical) will, in this application, be referred to as a circular cylinder. From this strict definition of cylindrical, one can readily see that wicket gates of the prior art (such as those shown in U.S. Pat. No. 4,203,703) are cylinders in that they have a constant cross section (by a plane perpendicular to the turbine axis) and the gates' surfaces are defined by a plurality of parallel lines which are parallel to the rotary axis of the turbine runner. It is evident that the discharge angle at the trailing edge of these wicket gates from the bottom (or first end as used herein) of the gate to the top (or second end as used herein) is constant. "Discharge angle" means the angle between the trailing edge exit element and the radial direction. It will be appreciated that referring to the bottom (or first end as used herein) and top (or second end as used herein) of the gate implies a turbine having a vertical rotary axis. This is illustrative only and this disclosure is equally applicable to turbines having an inclined or horizontal axis.

Although some prior art radial gates vary from cylindrical at the top (in order to provide stress relief at the attachment to the stems), and some have thinner trailing edge at the bottom, for all prior art radial wicket gates the discharge angle at the trailing edge of the wicket gate from the top of the gate to the bottom is constant and its inlet and trailing edges are straight segments parallel to the turbine axis.

In bulb turbines, whose intake is not radial, the wicket gates do not necessarily have a constant discharge angle along the trailing edge. For example, in U.S. Pat. Nos. 4,120,602 and 3,973,869, the wicket gates extend radially away from the axis of the turbine and their pivots are not parallel to the turbine axis. To effect closure of the gate, these wicket gates are designed such that their leading and trailing edges are part of the same cone.

The constant discharge angle of prior art wicket gates results in a variable value of whirl, $(V_u R)_{i-1}$ ($V_u$ is the circumferential component of absolute velocity vector R, is the radius from turbine axis) in the flow coming in the runner. This is due to the fact that water flows from the spiral casing through the wicket gates, the runner and the draft tube to discharge in a curved path.

Indeed, in turbines with a radial intake, the water flows radially through the wicket gates toward the turbine axis and is defect downwardly or axially toward the turbine discharge. Due to the curvature of the water flow, the radial component of the absolute velocity, $V_r$, at the trailing edge of the wicket gate decreases from the bottom of the gate to the top of the gate. Where the curvature of the water path is very sharp, there can be a sharp decrease in $V_r$ from the bottom of the wicket gate to the top of the wicket gate.

The vector velocity of the water flow from the wicket gates follows the trailing edge exit element and has the same angle with radial direction from the top of the wicket gate to the bottom of the wicket gate. Since $V_r$ decreases from the bottom of the gate to the top of the gate, $V_u$ also gets smaller from the bottom of the wicket gate to the top of the wicket gate. Therefore, the value of whirl, $(V_u R)_i$, decreases from the bottom to the top of the wicket gate (radius, R, along the discharge of the cylindrical wicket gate is constant).

The variable whirl value, $(V_u R)_i$, in the flow coming to the runner causes the following phenomena at the design mode (at optimum):

1. The incoming flow is not potential. According to Stokes' theorem, variation of the whirl value $(V_u R)_i$ along the wicket gate trailing edge creates a vortex wake leaving the trailing edges along the streamlines of the absolute flow. Therefore, there are $n_{wg}$ vortex wakes in the flow coming to the runner ($n_{wg}$ is the number of the wicket gates).

2. The incoming flow is not axisymmetric, since the axisymmetry is destroyed by the $n_{wg}$ vortex wakes.

3. The flow leaving the runner at design mode has a positive whirl value, $(V_u R)_e$, along the entire blade trailing edge, excluding the point at the hub/crown where the whirl value is zero; $(V_u R)_e$ has a maximum value at the periphery).

The change of the whirl value $\Delta(V_u R)$ in the runner for each elementary turbine is defined by the Euler equation:

$$\Delta(V_u R) = \frac{g \eta_{el} H}{\omega} \quad (1)$$

where:
g is the gravity acceleration
$\eta_{el}$ is the efficiency of the elementary turbine;
H is the head of the turbine; and
$\omega = \pi N/30$ is the angular velocity of turbine (N is the turbine rotation)

It is very important to note that for a turbine designed with $\eta_{el} = \eta_{max}$, $\Delta(V_u R)$ is constant along the runner span from the hub/crown to periphery.
The whirl value leaving the runner is:

$$(V_u R)_e = (V_u R)_i - \Delta(V_u R) \quad (2)$$

The value of $(V_u R)_e$ at the hub/crown must be equal to zero in order to avoid whirl along the turbine axis in the draft tube cone present after the runner, since the axial whirl causes loss of efficiency and instability of the flow in the draft tube. Thus, at the hub/crown the whirl value at the runner inlet is $[(V_uR)_i]_h = \Delta(V_uR)$. Since the whirl value at the runner inlet along the entire leading edge (excluding the point at the hub/crown) is larger than $[(V_uR)_i]_h$, the whirl value at the exit is positive and has a maximum at the periphery.

Let $(V_uR)_i = k[(V_uR)_i]_h$, where k monotonically increases from $k_h = 1$, at the hub/crown, to $k_p = k_m$, at the periphery (according to the experimental data coefficient $k_m$ varies from 1.1 to 3.0 for different water passages geometries). Thus, the following conditions for the inlet and the exit of the runner exit:

$$(V_uR)_i = k\Delta(V_uR) \quad (3)$$

$$(V_uR)_e = (k-1)\Delta(V_uR) \quad (4)$$

The phenomena described above are strongly pronounced in Kaplan, propeller and low/middle head Francis turbines ($k_m = 2.0$–$3.0$). In high head Francis turbines, these phenomena are not as strongly pronounced ($k_m = 1.1$–$2.0$), since in the high head Francis turbines the flow turns from radial to axial very gradually.

All these phenomena lead to the loss of efficiency. The energy of the vortices cannot be restored and they dissipate in the draft tube. The absence of the symmetry of the incoming flow causes instability of the flow angle along the runner blade inlet edge and, therefore, additional shock losses at the runner entrance are produced.

The losses causes by the positive value of the whirl along trailing edge of the runner can be computed as follows:

$$\Delta \eta = \frac{\pi \int_0^{L_e} (V_{ue})^2 V_{me} R_e dl_e}{gHQ} \quad (5)$$

where:
$V_{ue}$ is the value of circumferential projection of absolute velocity along the runner blade trailing edge;
$V_{me}$ is the value of meridional projection of absolute velocity along the runner blade trailing edge;
$L_e$ is the total length of the blade trailing edge;
$dl_e$ is differential of the length of the blade trailing edge;
$R_e$ is the radius along the blade trailing edge; and
Q is the flow rate of the turbine.

The described losses are estimated to be up to 2% for Kaplan and propeller turbines and to be up to 4% for low/middle head Francis turbines.

Additionally, in the low/middle head Francis turbines, the high positive value of the whirl value at the blade exit at periphery causes the cavitation coefficient value $\sigma$ at periphery to be much higher than at the crown.

SUMMARY OF THE INVENTION

The present invention discloses wicket gates and axial flow or mixed flow runner blades for a hydraulic turbine. The wicket gates are arranged in a general circular array around a central axis with the gates pivotal about pivot axes parallel to the central axis. Each of the wicket gates is provided with a trailing edge shaped to present a discharge angle which varies from a small discharge angle at a bottom of the gate to a large discharge angle at the top of the gate. The discharge angle at any pivot along the length of the trailing edge is preselected such that water flow having a known radial velocity vector at the trailing edge will have a constant circumferential velocity vector along the length of the trailing edge. The wicket gates deliver to the runner blades a flow where $(V_uR)_i = \Delta(V_uR)$ for all streamlines along the runner inlet. The shape of the runner blades is complementary to the shape of the wicket gates such that the whirl value $(V_uR)_e$ for the fluid flow exiting the runner blades is between about zero and a value that is less than the change in whirl from the inlet to the exit of the runner along the entire trailing edge. Preferably, the shape of the runner blades also results in an angle of attack of about zero for the fluid flow entering the runner blades.

Most preferably, a guide gate apparatus comprises a plurality of wicket gates arranged in a circular array around a central axis. The gates are pivotable about a pivot axis parallel to the central axis. The trailing part of the gates is shaped in such a way to form a chamber which varies from the bottom of the gate to the top of the gate so that the gate presents a varying discharge angle from the bottom to the top providing the constant value of $V_uR$ along entire trailing edge. The leading edges of the gates are shaped as straight cylinders parallel to the central axis and the trailing edge on the back side are shaped as straight segments to provide the guide gate apparatus with capability to close the water passages.

BRIEF DESCRIPTION OF THE DRAWINGS

The foregoing objects and attendant advantages of this invention will become more readily appreciated as the same become better understood by reference to the following detailed description when taken in conjunction with the accompanying drawings wherein.

DETAILED DESCRIPTION OF THE PREFERRED EMBODIMENTS

Figure 1:
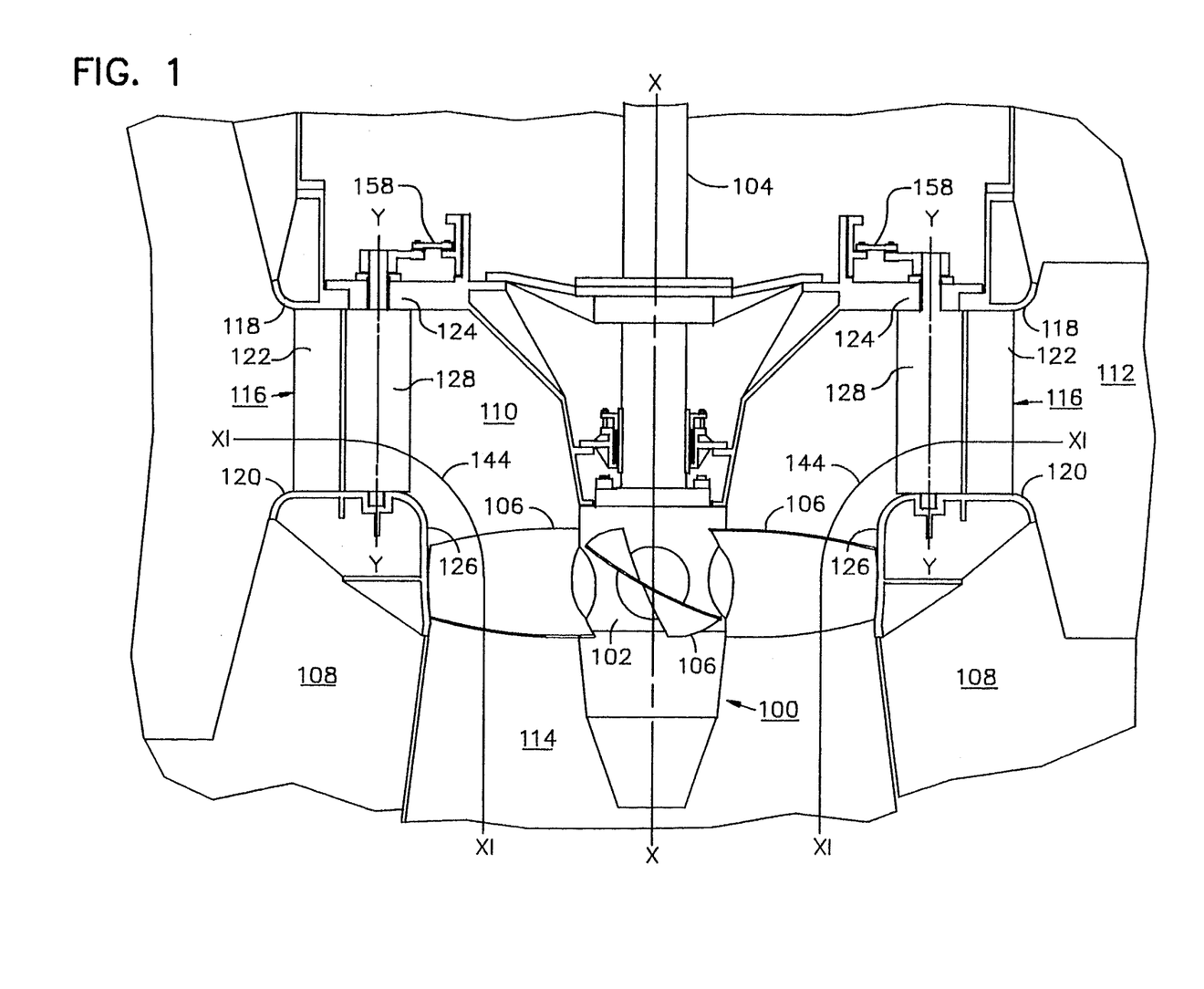
FIG. 1 is an elevation view, partially in cross-section, of a radial intake turbine with an axial-flow runner apparatus.

Referring now to FIG. 1, a radial intake turbine is shown which includes an axial-flow runner 100 consisting of a hub 102 secured to shaft 104 for rotation with shaft 104 about a vertical axis of rotation X—X. A plurality of turbine blades 106 extend radially and are pivotally secured to hub 102 (in the case of a propeller axial-flow runner 100, blades 106 are not pivotable). Foundation 108 surrounds the runner 100 and shaft 104. Foundation 108 surrounds a water passageway 110, which includes spiral casing 112 and draft tube 114.

Stay ring 116 has upper ring 118 and bottom ring 120. Upper ring 118 and bottom ring 120 are vertically aligned and spaced. A plurality of fixed stay vanes 122 are between upper ring 118 and bottom ring 120. Stay vanes 122 surround shaft 104 in a circular array. Stay ring 116 provides structural support between the upper head cover 124 and discharge ring 126. Fixed stay vanes 122 also give structural support, and provide minimum interference with water flow from spiral casing 112 to the runner 100.

A guide gate apparatus regulates the flow of water from casing 112 to runner 100. The guide gate apparatus includes a plurality of wicket gates 128 circumferentially disposed around the axis of rotation X—X. Each of the wicket gates 128 is pivotable about a pivot axis Y—Y, which is parallel to axis X—X. Wicket gates 128 can be pivoted to a closed position with contiguous wicket gates 128 abutting each other in sealing engagement. Water flow from spiral casing 112 to runner 100 is thus blocked. Alternatively, the wicket gates 128 can be opened to a desired angular position such that this angular position directs water flow to runner 100.

Figure 2:
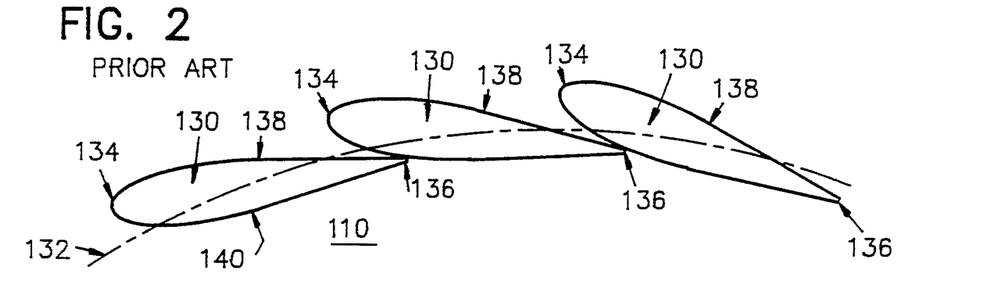
FIG. 2 is a partial cross-sectional view of a prior art guide gate apparatus showing the wicket gates in a closed position.

In prior art turbines, wicket gates had the same discharge angle along the entire trailing edge. Wicket gates 130 of the prior art turbines are shown in FIG. 2. FIG. 2 shows a portion of a guide gate apparatus viewed in a direction coaxial with the pivot axis of wicket gates 130. Circular arc 132 connects the pivot axes of wicket gates 130. In FIG. 2, wicket gates 128 are shown in a closed position with a leading edge 134 of each wicket gate 130 abutting the trailing edge 136 of a contiguous wicket gate. Since the gates are cylindrical, their surfaces being defined by a plurality of parallel lines, a point of contact is made between contiguous wicket gates along their entire length. A seal is thus formed which permits water flow from a back side of wicket gate 138 into the area on the front side of the wicket gate 140. The front of a wicket gate refers to that surface of the gate facing the central axis X—X of shaft 104 and the back side of a gate refers to the surface of a wicket gate facing away from the central axis X—X.

Figure 3:
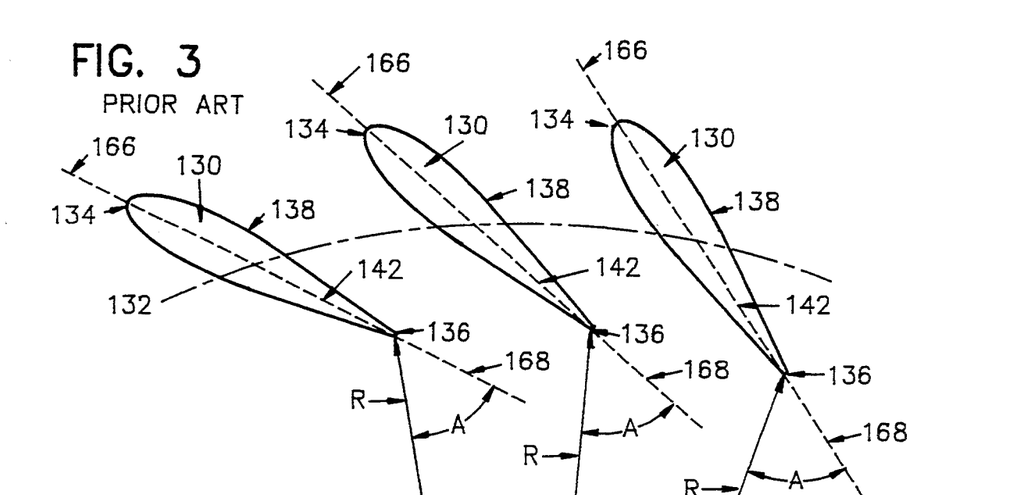
FIG. 3 is a view of FIG. 2 showing wicket gates in an open position.

In FIG. 3, wicket gates 130 are pivoted to an open position. Water flows from spiral casing 112 between the wicket gates 130 and into water passageway 110 surrounding the runner apparatus. FIG. 3 shows that prior art wicket gates 130 have a constant camber 142 across their cross-section. Camber 142 and radial line R, which extends from central axis X—X to trailing edge 136 of each gate, defines angle A, which is the discharge angle for wicket gate 130. For the prior art cylindrical wicket gate 130, discharge angle A is constant across the length of the wicket gate 130.

Again, referring to FIG. 1, curved arrow 144 indicates the direction of water flow from spiral casing 112 through passage 110 and into discharge draft tube 114. The degree of curvature of the water flow direction will be influenced by the degree of curvature of discharge ring 126. For installations having a sharp degree of curvature for ring 126, and a resulting sharp curvature of the water flow direction, significant inefficiencies will result with the use of prior art wicket gate 130 because vortex formation will occur along the absolute velocity vector of the water flow. The radial component of velocity $V_r$ will thus decrease from the bottom of wicket gate 130 to the top of the gate. The circumferential component of velocity $V_u$ will also decrease from the bottom of the gate to the top.

Figure 4:
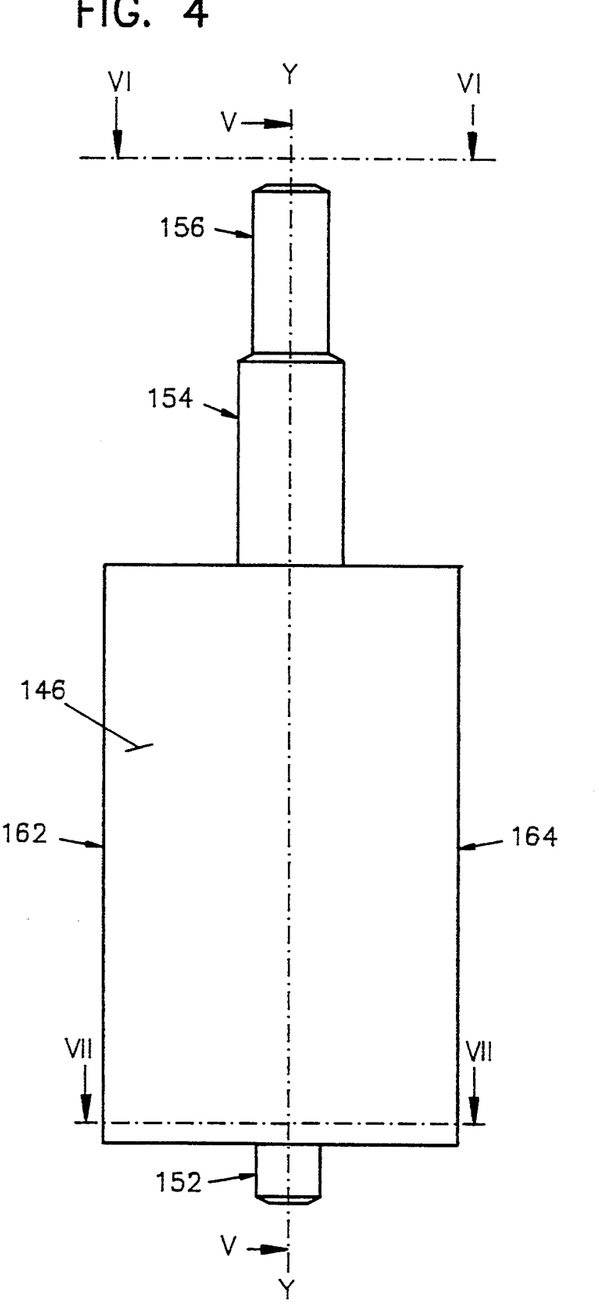
FIG. 4 is a view of a wicket gate in accordance with the present invention.

The loss in efficiency can be reduced by providing a noncylindrical wicket gate, a wicket gate whose surfaces are not defined by a plurality of parallel lines. A non-cylindrical wicket gate is shown in FIG. 4, which is a view of a back surface of wicket gate 128 with its pivotal axis Y—Y horizontally disposed. The gate includes gate body 146 which has a back surface 148. Back surface 148 faces away from the central axis of the turbine when the gate is disposed in a circular array around a central axis. Front surface 150 faces the central axis X—X. Bottom stem 152, on an end of gate body 146, faces bottom ring 126. Top stem 154 extends from an end of the gate body and faces the head cover 124. Top stem 154 includes handle 156 which will be operatively connected to gate linkage mechanism 158 (shown in FIG. 1). Gate linkage mechanism 158 operates to pivot gate 128 in a conventional manner around axis Y—Y when gate 128 is installed in a circular array around the central axis X—X.

Figure 5:
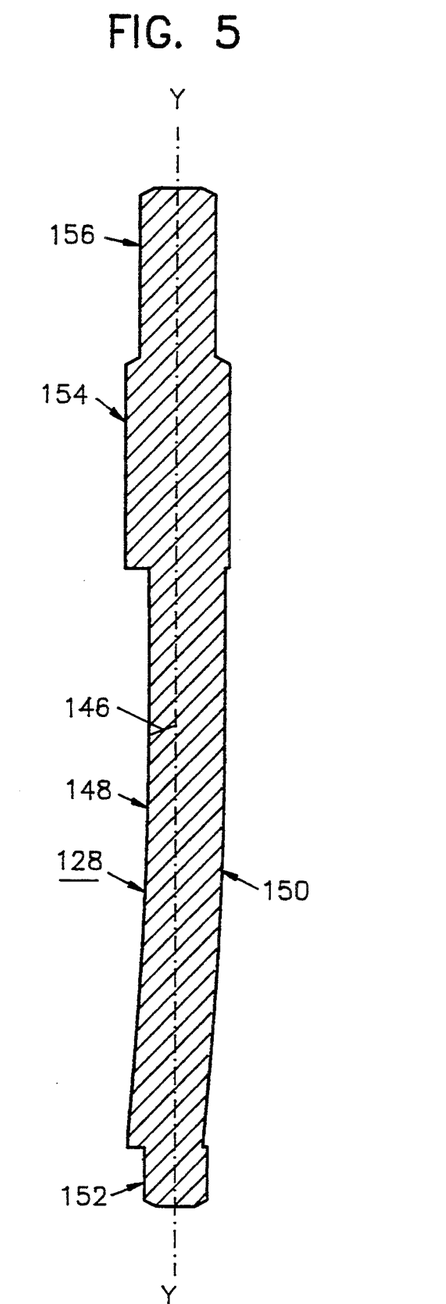
FIG. 5 is a cross-sectional view taken along line V—V of FIG. 4.
Figure 6:
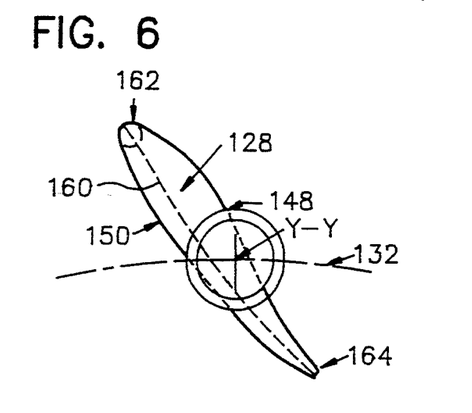
FIG. 6 is a cross-sectional view taken along line VI—VI of FIG. 4.
Figure 7:
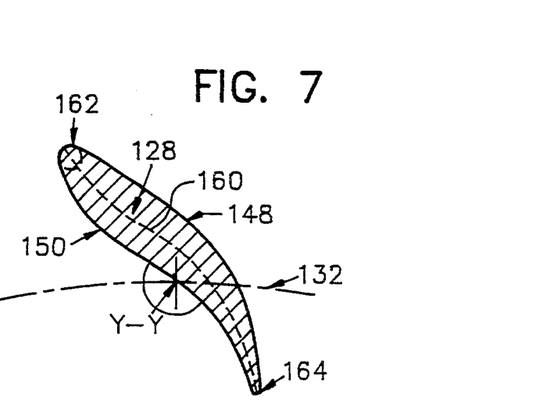
FIG. 7 is a cross-sectional view taken along line VII—VII of FIG. 4.

As can be seen in FIG. 5, gate 128 is not symmetrical about axis Y—Y. From FIGS. 6 and 7, it can be seen that gate 128 is not a cylindrical gate such as gates 130. There is no alignment of the cross-sections of FIGS. 6 and 7 which would be inherent in a cylindrical gate. Also, camber line 160 of gate 128 is a curved line the shape of which is different along the various cross-sections as can be shown by comparison of FIGS. 6 and 7.

Figures 8, 9:
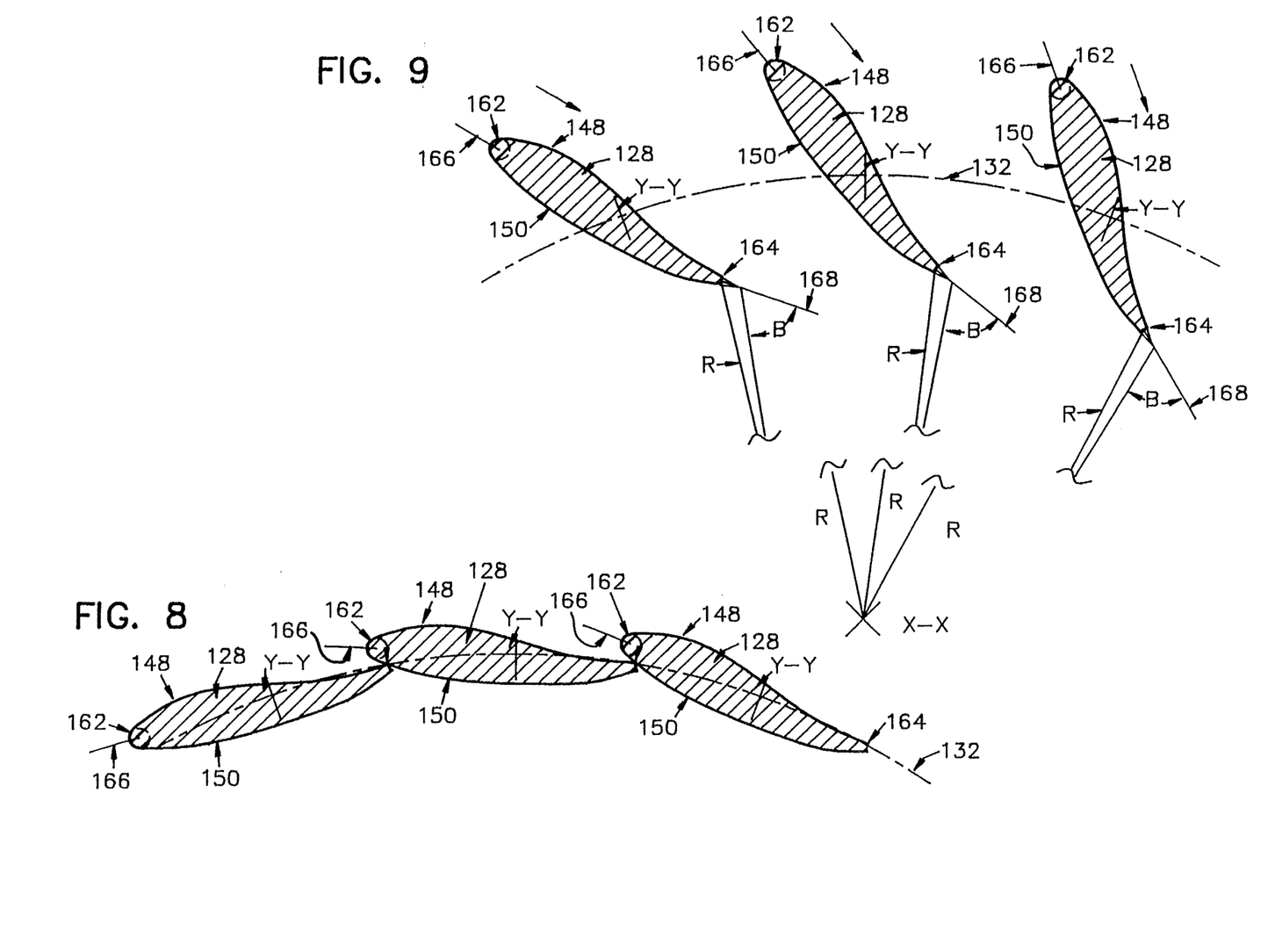
FIG. 8 is a partial cross-sectional view of a guide gate apparatus of the present invention taken at the first end of the wicket gate showing the gates in a closed position.
FIG. 9 is a view of FIG. 8 showing the gates in an open position.
Figures 10, 11:
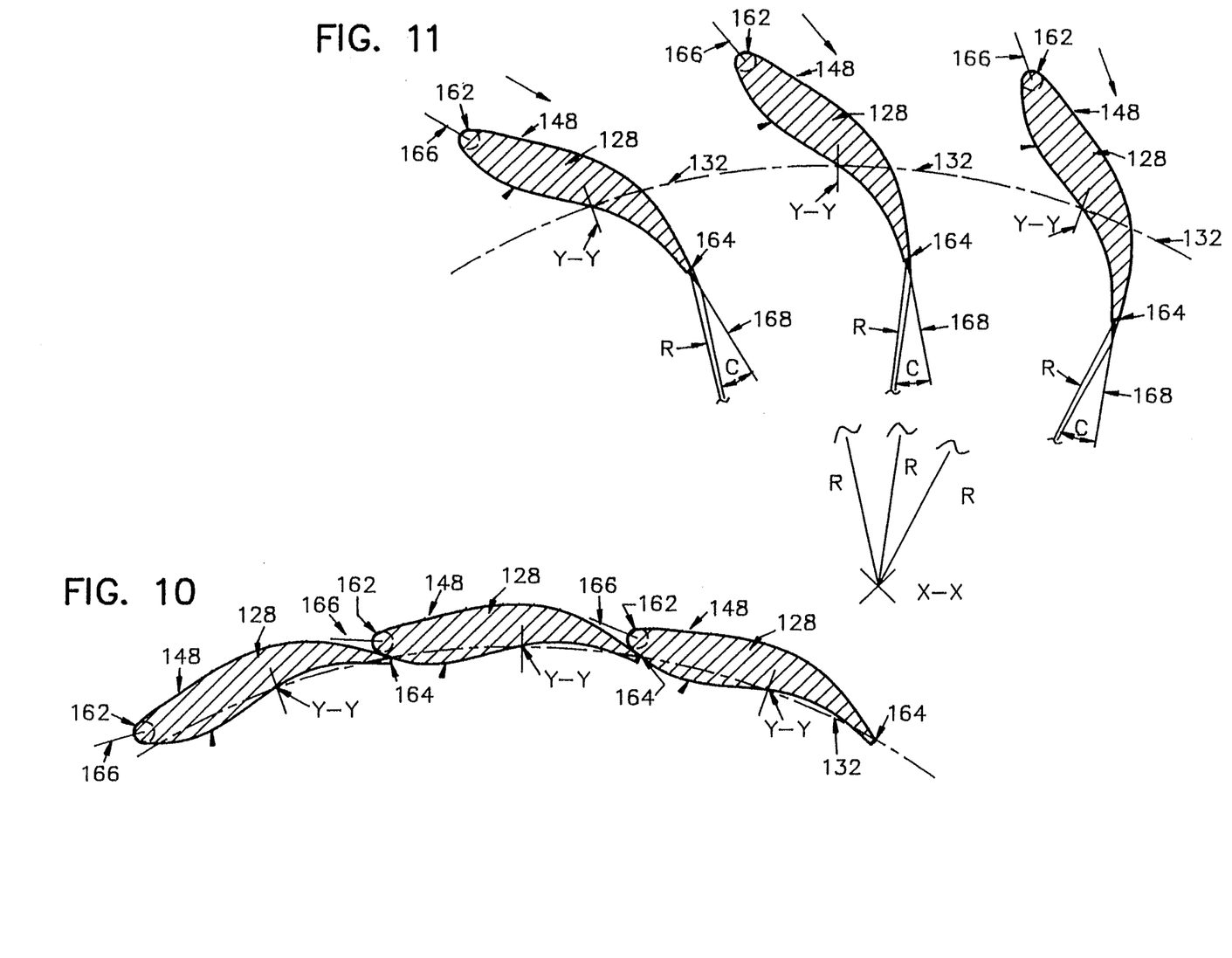
FIG. 10 is a partial cross-sectional view of a guide gate apparatus of the present invention taken at the second end of the wicket gate showing the gate in a closed position.
FIG. 11 is a view of FIG. 10 showing the gates in an open position.

In the operation of the turbine, the critical positions of the wicket gate 128 are the trailing edge 164 and the leading edge 162. FIGS. 8–11 show three wicket gates 128 of the present invention with FIGS. 8 and 10 showing the wicket gates 128 in a closed position and FIGS. 9 and 11 showing the wicket gates 128 in an open position. FIGS. 8 and 9 show the guide gate apparatus when viewed downwardly in a vertical turbine from the top of the gates with gate 128 having the cross-section profile of FIG. 6 at the top of the gates. FIGS. 10 and 11 are views comparable FIGS. 8 and 9 with the only difference being these views are taken looking downwardly at a cross-section at the bottom of the gates where gates 128 have the cross-sectional profile of FIG. 7. Circular arc 132 is shown connecting the pivot axes Y—Y of gates 128. In FIGS. 8-11, wicket gates 128 are represented by solid lines for both leading edge 162 and trailing edge 164 of each of gates 128. Front surface 150 and back surface 148 of each of gates 128 are shown as only one of many possible shapes, as the actual shape of these surfaces is not important to the present invention and may vary considerably. However, it will be understood by those skilled in the art that such surfaces preferably will be selected to provide minimum water flow interference as water flows from leading edge 162 to trailing edge 164. Also, full camber line 160 is not shown in FIGS. 8-11. Only a portion of camber line 160 is shown for both leading edge 162 and trailing edge 164. The camber line for leading edge 162 is camber line 166. The camber line for trailing edge 164 is camber line 168. Camber lines 166 and 168 are not collinear for any given gate 128.

In FIG. 9, line R is drawn from central axis X—X of the turbine to intersect trailing edge camber 168 at trailing edge 164 of each of wicket gates 128. The lesser included angle defined by the intersection of the lines is designated as angle B, which is the discharge angle for each of wicket gates 128 at the top end of gate 128. FIG. 11 is a view similar to FIG. 9 but showing the wicket gates cross-sections taken at the bottom of wicket gates 128. As can be seen in FIG. 11, for the same pivotal orientation of wicket gates 128, the trailing edges of gates 128 have been shaped such that, at the bottom of gates 128, the discharge angle C is smaller than at the top of gate 128. Indeed, if a similar figure were made showing a slice of the wicket gate at any intermediate point between the top and the bottom of the gate, it will show a discharge angle having a progressively increasing size from the bottom of the gate to the top. The trailing edge is shaped with this constantly changing discharge angle such that water flowing past the wicket gate 128 will have a circumferential component of velocity $V_u$ which will result in $V_u R =$ const along the trailing edge.

Determining the proper shape of trailing edge 164 of gate 128 such that water flowing past it has a desirable circumferential velocity component $V_u$ along the length of the trailing edge is as follows. For any given turbine, the radial velocity component ($V_r$) profile for water flowing past the wicket gate can be derived. For a vertical axis turbine having a curved water flow passage 144 (as shown in FIG. 1), the radial velocity component $V_r$ of the water flow becomes progressively smaller from the bottom of the wicket gate to the top. For any particular turbine, it is well within the skill of the art to predict quantitatively the radial velocity component $V_r$ at any point along the gate trailing edge. Once the radial velocity component $V_r$ is known, the discharge angle can be selected such that the circumferential velocity component $V_u$ residue in $V_u R =$ const at design value of gate angle. If $V_u R$ is constant, the flow should be potential, i.e. free of vortices.

Figure 12:
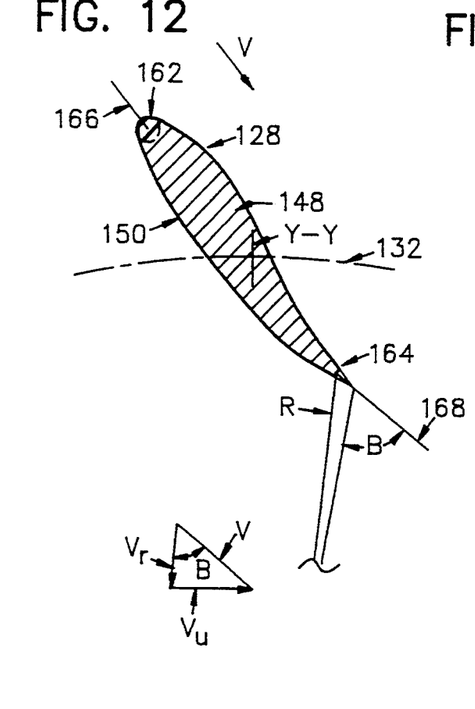
FIG. 12 is a view of a wicket gate taken at a first end thereof with vector diagrams of water flow at the trailing edge of the gate.
Figure 13:
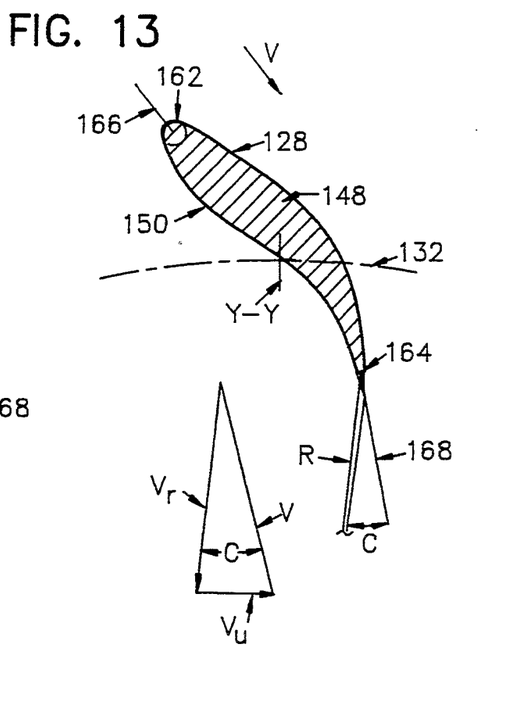
FIG. 13 is a view of a wicket gate taken at a second end thereof with vector diagrams of water flow at the trailing edge of the gate.

As shown in FIGS. 12 and 13, the angle of the trailing edge is shaped to provide a desired circumferential velocity component $V_u$. FIG. 12 shows trailing edge 164 of gate 128 at the top of the gate. At this point, trailing edge camber 168 presents a discharge angle B with the radial line R. Superimposed on FIG. 12 is a vector diagram showing the velocity V at trailing edge 164 broken down into a radial and circumferential components. The radial velocity component $V_r$ is predetermined, is small at the top of the gate, and is parallel to line R. The circumferential velocity component $V_u$ is perpendicular to $V_r$. The velocity V of water flow is parallel to trailing edge camber 168. FIG. 13 is similar to FIG. 12, but with trailing edge 164 taken at the bottom of the wicket gate 128. At this location, trailing edge camber 168 presents an angle C with respect to the radial line R. FIG. 13 also includes a vector diagram for determining circumferential velocity component $V_u$. For a smaller discharge angle C, a desirable circumferential velocity component $V_u$ can be attained for a larger radial velocity component $V_r$. Accordingly, for the entire length of trailing edge 164 of wicket gate 128, once the radial velocity component $V_r$ is known for each point along the length of trailing edge 164, trailing edge 164 can be shaped such that the circumferential velocity component $V_u$ will result in constant whirl, $V_u R$, for the water flow along the entire trailing edge 164 of wicket edge 128.

As shown in FIGS. 8-11, leading edge camber line 166 is at the same angle with respect to a radial line from the center axis X—X for all cross-sections of wicket gate 128. Preferably, this angle will be set such that the angle of attack for the leading edge with espect to water flowing into wicket gate 128 will be close to zero from top to bottom of leading edge 162 of wicket gate 128 when the gates are opened to a predetermined design position which is representatively shown in FIGS. 9 and 11. With the leading edge of each wicket gate so shaped, wicket gates 128 will produce the smallest possible entrance loss for water flowing past wicket gates 128; each wicket gate 128 having an S-shaped camber line 160 as is evident in FIGS. 6 and 7.

Figure 14:
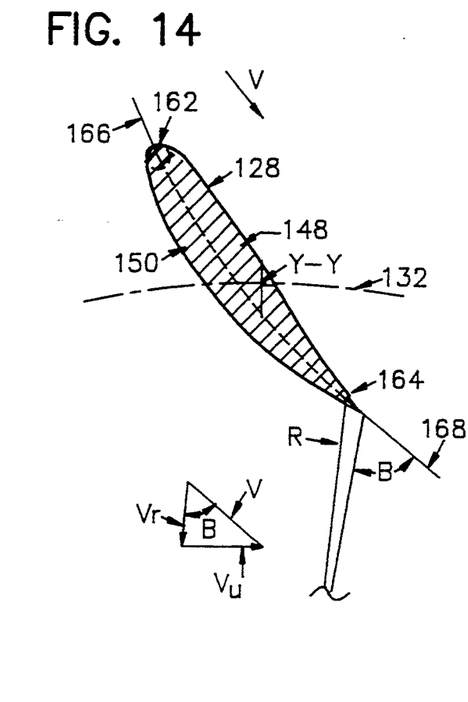
FIG. 14 is a cross-sectional view of an alternative embodiment of a wicket gate of the present invention taken at a first end thereof.
Figure 15:
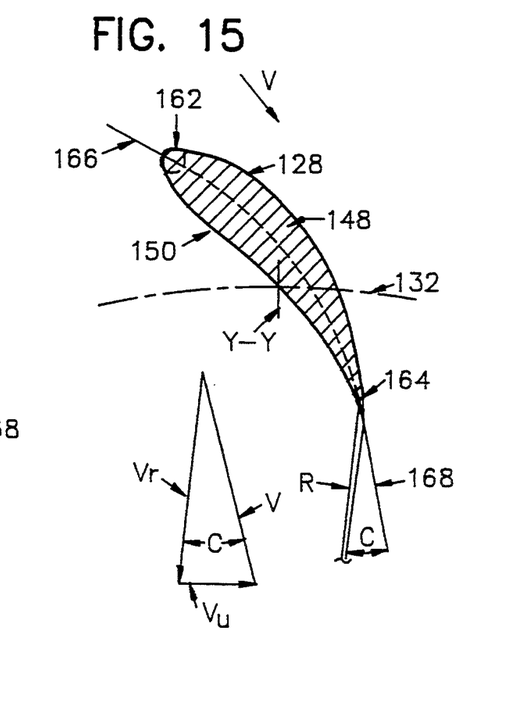
FIG. 15 is a cross-sectional view of the wicket gate of FIG. 14 taken at a second end thereof.

In an alternative embodiment, wicket gate 128 is configured such that at any given cross-section, camber line 160 of wicket gate 128 is a circular arc at the top and bottom of wicket gate 128, as shown in FIGS. 14 and 15. FIG. 14 shows wicket gate 128 having a discharge angle identical to that of FIG. 12 but with wicket gate 128 having circular arc chamber 160. Likewise, FIG. 15 shows wicket gate 128 having a discharge angle identical to that shown in FIG. 15 but with a circular arc camber 160. In this alternate embodiment, FIG. 4 is a cross-section of wicket gate 128 taken at the top of wicket gate 128. FIG. 15 is a cross-section of wicket gate 128 taken at the bottom of wicket gate 128. In the embodiment represented by FIGS. 14 and 15, the leading edge of wicket gate 128 will present an angle of attack to water flowing past the gate which could result in a small entrance loss. However, a gate formed as shown in FIGS. 14 and 15 may be easier and more economical to produce.

In addition to controlling the flow of water to runner 100 to produce a constant value of $V_u R$ along trailing edge 164 of wicket gates 128, the guide gate apparatus should also seal water flow from spiral casing 112 to runner 100. With wicket gates 128 made according to the present invention, this is accomplished by insuring that wicket gate leading edge 162 defines a line parallel to the central axis X—X. Also, trailing edge 164 on the back surface of wicket gate 128 must define a line parallel to the central axis X—X, with these two lines on any given gate spaced apart sufficient such that, when the gates are put into a circular array, a vertical line of a leading edge of a gate will be collinear with a vertical line on the trailing edge of a contiguous gate when the gates are rotated to a closed position. In this position, the leading edge and trailing edge surfaces will be joined in sealing engagement at these lines to prevent water flow. This is most easily accomplished by providing the leading edge 162 with a shape which is cylindrical. The leading edge of wicket gates 128 is thus a surface which is defined by a plurality of parallel lines which are also parallel to the pivotal axis of wicket gate 128. More specifically, the leading edge surface will be a portion of either a circular cylinder or a parabolic cylinder.

It is important to establish the difference in relative flow velocity directions at the runner inlet and exit at the design mode for the present invention and the prior art. The angle, $\beta$, between relative velocity vector W and circumferential direction can be determined as follows:

$$\tan\beta = \frac{V_m R}{V_u R - \omega R^2} \quad (6)$$

Using equation (1), at the design mode for the mixed flow or axial flow runner of the present invention angle $\beta$ for the inlet and the exit of the runner is:

$$\tan\beta_i = \frac{V_m R}{\frac{g\eta H}{\omega} - \omega R^2} \quad (7)$$

$$\tan\beta_e = -\frac{V_m}{\omega R} \quad (8)$$

Using the equation (1) and conditions (2) and (3), at the design mode for prior art angle $\beta$ for the inlet and the exit of the runner is:

$$\tan\beta_i = \frac{V_m R}{k\frac{g\eta H}{\omega} - \omega R^2} \quad (9)$$

$$\tan\beta_e = -\frac{V_m R}{(k-1)\frac{g\eta H}{\omega} - \omega R^2} \quad (10)$$

In a case of the radial intake turbine with axial flow runner the value of the meridional projection of absolute velocity is the same at inlet and exit of the runner for each streamline and can be approximately expressed as follows:

$$V_m = \frac{4Q}{\pi(D_r^2 - d_h^2)} \quad (11)$$

where:
$D_r$ is the diameter of the runner; and
$d_h$ is the diameter of the runner hub Therefore, for the present invention in the case of an axial-flow runner the design mode angle $\beta$ for the inlet and the exit of the runner is:

$$\tan\beta_i = \frac{4QR}{\pi(D_r^2 - d_r^2)\left(\frac{g\eta H}{\omega} - \omega R^2\right)} \quad (12)$$

$$\tan\beta_e = -\frac{4Q}{\pi\omega R(D_r^2 - d_h^2)} \quad (13)$$

And for the prior art in the case of an axial-flow runner the design mode angle $\beta$ for the inlet and the exit of the runner is:

$$\tan\beta_i = \frac{4QR}{\pi(D_r^2 - d_h^2)\left(k\frac{g\eta H}{\omega} - \omega R^2\right)} \quad (14)$$

$$\tan\beta_e = \frac{4QR}{\pi(D_r^2 - d_h^2)\left[(k-1)\frac{g\eta H}{\omega} - \omega R^2\right]} \quad (15)$$

Figures 16, 18:
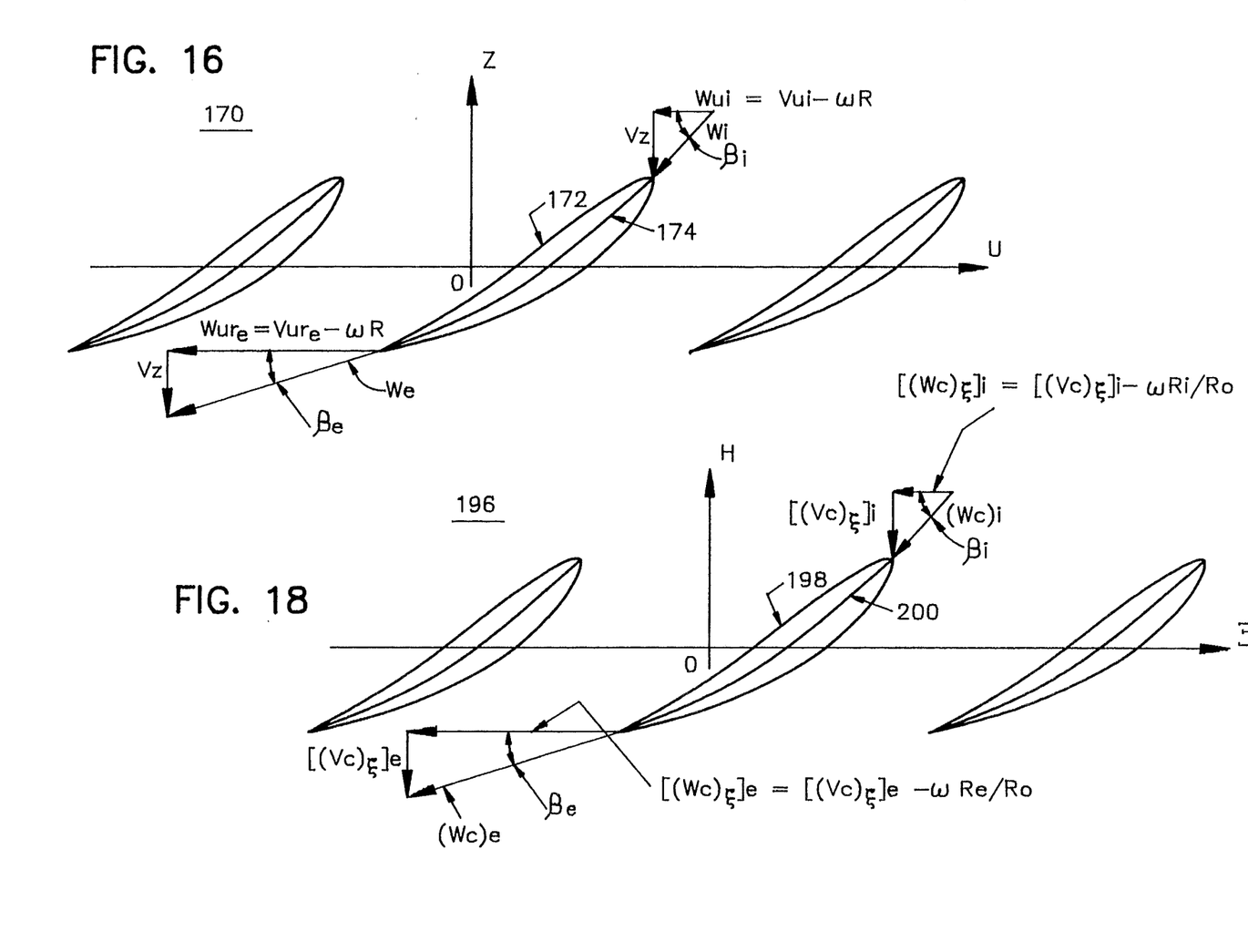
FIG. 16 is a straight cascade of profiles with relative flow velocity diagrams shown as a development of the cascade, which is an intersection of the cylindrical stream surface XI—XI of the axial runner of FIG. 1.
FIG. 18 is a straight cascade of profiles with relative flow velocity diagrams shown as a conformal mapping of the cascade, which is an intersection of the stream surface XII—XII of the mixed-flow runner of FIG. 17.

As can be seen in FIG. 1 the stream surfaces of axisymmetric meridional flow in the water passages of the radial intake turbine with axial-flow runners are very close to being circular cylinders between the inlet and the exit of axial flow runner 100. In FIG. 16 there is shown a development onto a plane of a cylindrical cascade of profiles which is the result of the cross-section of the cylindrical part of the stream surface XI—XI with blades 106 of axial-flow runner 100 in FIG. 1. The cylindrical cascade consists of $n_{b1}$ profiles ($n_{b1}$ is the total number of blades 106). The development onto the plane of a cylindrical cascade represents as infinite straight cascade 170 of profiles 172 along axis OU, which represents the circumferential direction. The axis OZ in FIG. 16, which is perpendicular to straight cascade 170, is parallel to turbine axis X—X. There are only three profiles 172 of the infinite straight cascade 170 shown in FIG. 16. The middle line 174 of profile 172 will be called "skeleton line" in the following description. At the inlet to cascade 170, skeleton line 174 of profile 172 has to be tangent to the inlet relative flow velocity vector, $W_i$, in order to avoid shock loss. At the exit from cascade 170, the exit relative flow velocity vector, $W_e$, is approximately tangent to skeleton line 174, with a deviation within about 1°. Therefore, the tangents to skeleton line 174 of profile at the inlet and the exit are parallel to the relative flow velocity vectors at inlet and exit, respectively. The angle, $\beta$, between relatively velocity vector W and the circumferential direction for the present invention axial-flow runner at the inlet and the exit is computed using formulae (12) and (13). For the prior art axial-flow runner formulae (14) and (15) is used.

Figure 17:
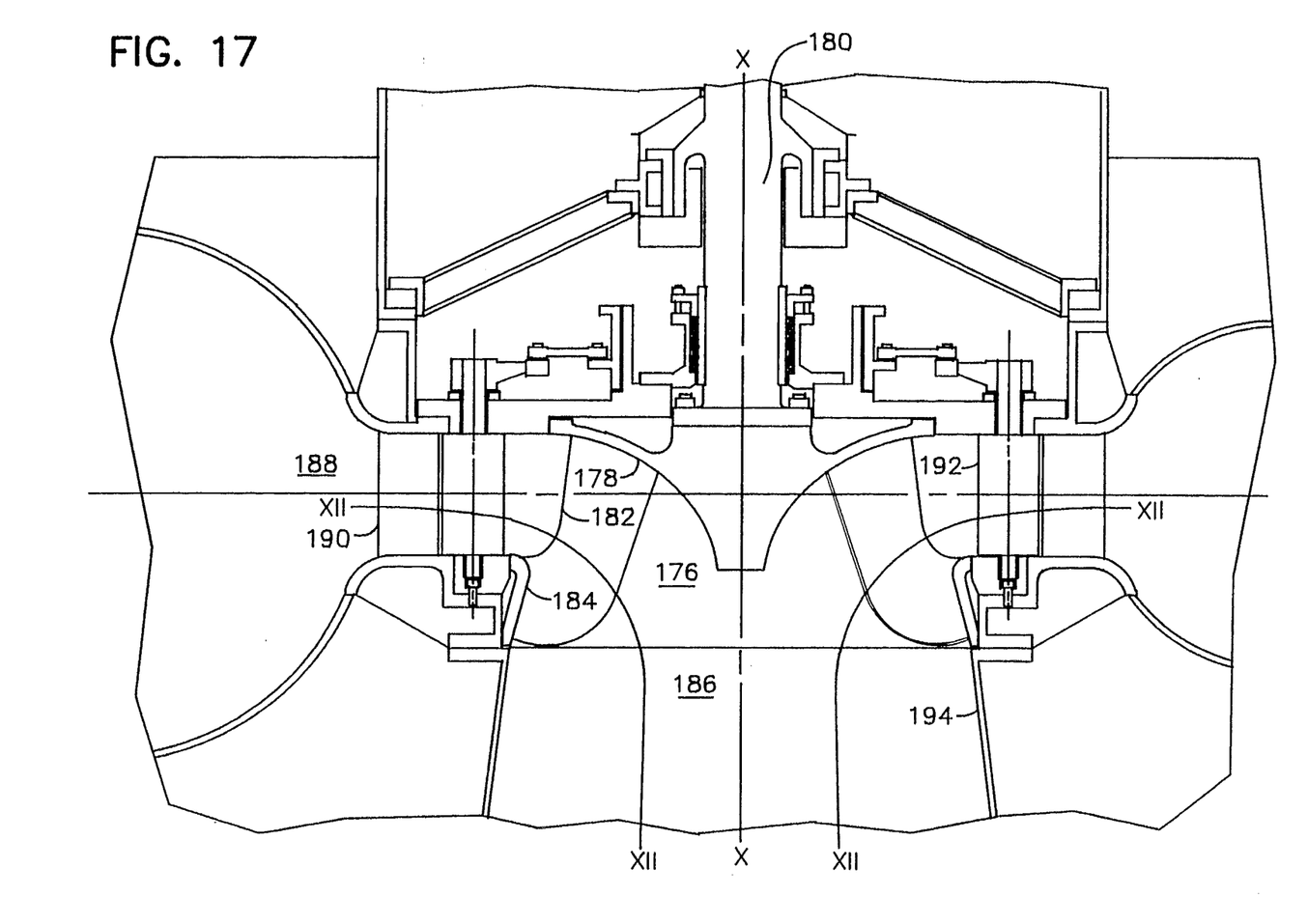
FIG. 17 is an elevation view, partially in cross-section, of a radial intake turbine with a mixed-flow runner apparatus.

Referring now to FIG. 17, a radial intake turbine installation is shown which comprises a mixed-flow runner 176 consisting of a crown 178 secured to a shaft 180 for rotation with shaft 180 about a vertical axis of rotation X—X. A plurality of turbine blades 182 are secured to crown 178 and to rim 184 surrounding the runner at the periphery to define a water passageway 186 which includes spiral casing 188 with radial stay vanes 190, radial wicket gates 192, and draft tube 194. Radial wicket gates 192 for the present turbine are the same as for the radial intake turbine with axial-flow runners. Radial wicket gates 192 are thus described above and presented in FIGS. 4–15.

As can be seen in FIG. 17, the stream surfaces of axisymmetric meridional flow in the water passages of the radial intake turbine with mixed-flow runner are not close to being circular cylinders between the inlet and the exit of runner 176. Therefore, for mixed-flow runners, a conformal mapping onto a plane of a general cascade of profiles that is the result of the cross-section of stream surface XII—XII with blades 182 of mixed-flow runner 176 in FIG. 17 must be used:

$$\Xi = \Phi R_0 \quad (16)$$

$$H = \int_0^{l_s} \frac{R \, dl_s}{R_0} \quad (17)$$

$$(V_c)_\xi = \frac{R}{R_0} V_u \quad (18)$$

$$(V_c)_\eta = \frac{R}{R_0} V_m \quad (19)$$

where:
$\Xi$ and $H$ are the Cartesian coordinates in the plane domain;
$R$ and $\Phi$ are the cylindrical coordinates for the point along the stream surface XII—XII;
$l_s$ is the length along a streamline of the stream surface XII—XII;
$R_0$ is the value of $R$ for the point at a streamline of the stream surface XII—XII with $l_s=0$; and
$[(V)_c]_\xi$ and $[(V)_c]_\eta$ are absolute velocity components in the plane domain.

In FIG. 18 there is shown a plane domain which is the result of the conformal mapping described above. As for the cylindrical cascade for the axial-flow runners, the general cascade consists of $n_{b1}$ profiles ($n_{b1}$ is the total number of blades 182). The conformal mapping onto the plane of a general cascade represents an infinite straight cascade 196 of profiles 198 along axis $O\Xi$. There are only three profiles 198 of the infinite straight cascade 196 shown in FIG. 18. As in the case of axial-flow runners, middle line 200 of profile 198 will be called "skeleton line" in the following description. At the inlet to cascade 196, skeleton line 200 of profile 198 has to be tangent to the inlet relative flow velocity vector, $(W_c)_i$. At the discharge $(W_c)_e$ is approximately tangent to skeleton line 200, with a deviation within about 1°. Therefore, the tangents to skeleton line 200 of profile 198 at the inlet and the exit are parallel to the relative flow velocity vectors at the inlet and the exit, respectively. Since the conformal mapping preserves all angles between corresponding lines, the angle, $\beta$, between relative velocity vector $W_c$ and $O\Xi$ at the inlet and the exit is computed using formulae (7) and (8) for the present invention mixed-flow runner. For the prior art mixed-flow runner, formulae (9) and (10) is used. An important aspect of the present invention is that for both mixed-flow runners and axial flow runners, the runner blades are configured such that fluid flow at substantially every point exiting the runner apparatus is between about zero and a value that is less than the change in whirl from the inlet to the exit of the runner apparatus.

As can be seen from formulae (7)–(10): the values of $\beta_i$ and $\beta_e$ for the present invention and for prior art (for both axial and mixed-flow runners) are almost the same at the hub (a little difference is caused by the difference in the values of $\eta$ for present invention and prior art) and the biggest difference between these angles is at periphery, where for the prior art $k = k_m$.

Figure 19:
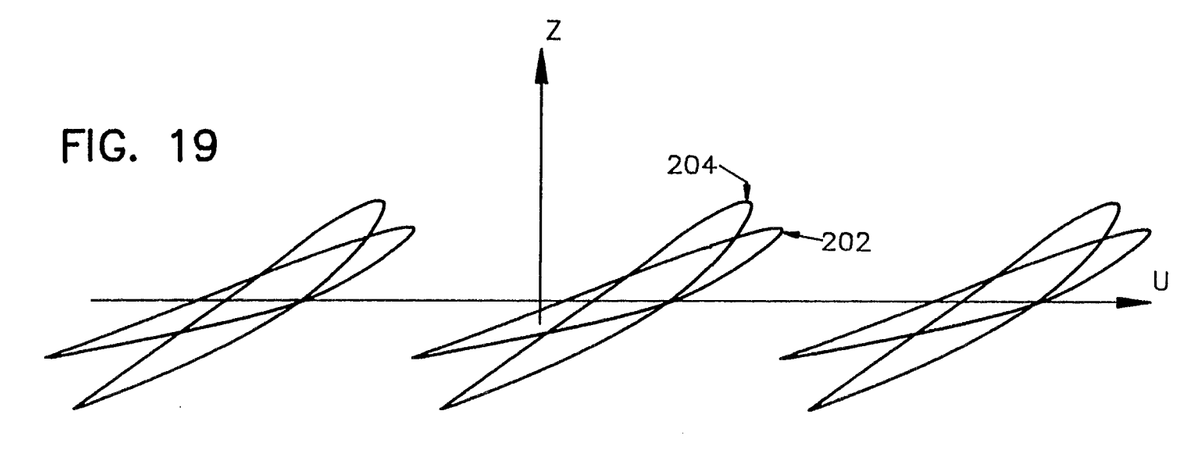
FIG. 19 is a comparison of the straight cascade of profiles at the periphery for the present invention axial-flow runner and for the prior art axial-flow runner.

The difference in shape of the peripheral profiles is shown below using the example of the radial intake turbine with axial-flow runners. FIG. 10 shows the periphery profiles having the same length of skeleton lines and the same thickness. Profile 202 is for the present invention axial-flow runner blade and profile 204 is for the prior art axial-flow runner blade. These two profiles 202 and 204 are designed for the same values of flow rate (Q), head (H), diameter of the runner and hub ($D_r$ and $d_h$), and rotation (N). The following values were used for the comparison:

$D_r = 1.000$ m
$H = 30.00$ m
$Q = 7.67$ m$^3$/sec (unit flow rate $Q_{11} = 1.40$ m$^3$/sec)
$N = 600.00$ rpm (unit rotation $N_{11} = 109.54$ rpm)
$\eta = 0.92$ (for prior art)
$\eta = 0.94$ (for the present invention)
$d_h = 0.47$
$k_m = 2.20$ The formulae (12) and (13) yielded for the runner of the present invention $\beta_i = 29.00°$ and $\beta_e = =21.75°$. The formulae (14) and (15) yielded for the prior art runner: $\beta_i = -45.18°$ and $\beta_e = -30.74°$. As can be seen from the FIG. 19 the difference in the shape of the periphery profile 202 (for the present invention runner blade) and of the periphery profile 204 (for the prior art runner blade) is significant.

While preferred embodiments of the invention have been illustrated and described, it will be appreciated that various changes can be made therein without departing from the spirit and scope of the invention.

I claim:

1. In combination, a guide gate apparatus and runner apparatus for a hydraulic turbine comprising:
a plurality of wicket gates arranged in a circular array around a central axis with said gates pivotal about a pivot axis parallel to said central axis forming said guide gate apparatus, said gates each having a leading edge and a trailing edge with said trailing edge shaped to present a discharge angle which varies from a first end of said gate to a second end of said gate; and
a plurality of runner blades forming said runner apparatus, said runner apparatus having an inlet and an exit, the shape of said runner blades being a function of the shape of said wicket gates such that a whirl value for fluid flow at substantially every point exiting said runner apparatus is between about zero and a value that is less than the change in whirl from said inlet to said exit of said runner apparatus.

2. The combination of claim 1 wherein said wicket gate discharge angle generally increases from said first end to said second end.

3. The combination of claim 2 wherein said wicket gate trailing edge is shaped for said discharge angle to direct a flow of water having a radial velocity component which generally decreases from said first end to said second end at said trailing edge with said discharge angle selected to direct said flow of water with said flow of water having a whirl value along said trailing edge, wherein said whirl value along said trailing edge equals:

$$\frac{g\eta H}{\omega}$$

where
g is the acceleration of gravity;
η is the efficiency of the turbine;
H is the design head of the turbine;
ω=πN/30 is the design angular velocity of the turbine and
N=the number of revolutions per minute of the turbine.

4. The combination of claim 3 wherein the shape of said runner blades is a function of the shape of said wicket gates such that an angle of attack for the fluid flow entering said runner apparatus is about zero.

5. The combination of claim 3 wherein said runner apparatus is a mixed flow runner.

6. The combination of claim 4 wherein said runner apparatus is a mixed flow runner.

7. The combination of claim 6 wherein said runner blades have trailing edges each having a discharge angle, $\beta_e$, wherein $$\tan\beta_e = -\frac{V_m}{\omega R}$$

where
$V_m$ is the meridional component of velocity along the trailing edge of said blades; and
R is the radius from the turbine axis along the trailing edge of said wicket gates.

8. The combination of claim 6, wherein said runner blades have leading edges each having an entrance angle, $\beta_i$, wherein $$\tan\beta_i = \frac{V_m R}{\frac{g\eta H}{\omega} - \omega R^2}$$

where
$V_m$ is the meridional component of velocity along the leading edge of said blades; and
R is the radius from the turbine axis along the leading edge of said wicket gates.

9. The combination of claim 3 wherein said runner apparatus is an axial flow runner.

10. The combination of claim 4 wherein said runner apparatus is an axial flow runner.

11. The combination of claim 10 wherein said runner blades have trailing edges each having a discharge angle, $\beta_e$, wherein $$\tan\beta_e = -\frac{V_m}{\omega R}$$

where
$V_m$ is the meridional component of velocity along the trailing edge of said blades; and
R is the radius from the turbine axis along the trailing edge of said wicket gates.

12. The combination of claim 11 wherein $$\tan\beta_e = -\frac{4Q}{\pi\omega R(D_r^2 - d_h^2)}$$

where

Q is the design flow of the turbine;
R is the radius from the turbine axis along the trailing edge;
$D_r$ is the diameter of the runner; and
$d_h$ is the diameter of the runner hub.

13. The combination of claim 12, wherein said runner blades have leading edges each having an entrance angle, $\beta_i$, wherein $$\tan\beta_i = \frac{V_m R}{\frac{g\eta H}{\omega} - \omega R^2}$$

where
$V_m$ is the meridional component of velocity along the leading edge of said blades; and
R is the radius from the turbine axis along the leading edge of said wicket gates.

14. The combination of claim 13 wherein $$\tan\beta_i = \frac{4QR}{\pi(D_r^2 - d_h^2)\left(\frac{g\eta H}{\omega} - \omega R^2\right)}.$$

15. The combination of claim 1 wherein each of said wicket gates has a first congruent sealing line on a first side of said gate and a second congruent sealing line on a second side of said gate, said first congruent sealing line of said gate abutting a second congruent sealing line of a contiguous gate when said gates are pivoted to a closed position.

16. The combination of claim 1 wherein each of said wicket gate leading edges is provided with a surface defining a line on said surface parallel to said pivot axis and wherein each of said wicket gate trailing edges has a surface defining a line parallel with said pivot axis such that said line on said leading edge surface is spaced from said line on said trailing edge an amount sufficient for said line on said leading edge surface of said gate to abut in sealing engagement a line on a trailing edge of a contiguous gate when said gates are pivoted to a closed position.

17. The combination of claim 16 wherein said wicket gate leading edge is defined by a portion of a cylinder parallel to said pivot axis.

18. The combination of claim 17 wherein said wicket gate leading edge is defined by a portion of a circular cylinder parallel to said pivot axis.

19. The combination of claim 16 wherein said wicket gate leading edge presents a camber, said wicket gate leading edge being shaped such that said camber at said wicket gate leading edge presents a generally zero angle of attack to a flow of water flowing toward said leading edge when said gates are rotated to a predetermined pivotal position.

20. The combination of claim 16 wherein a camber line of said wicket gates is a generally circular arc along the length of said gates.

21. A hydraulic turbine having a shaft with a central axis, a guide gate apparatus around said shaft central axis, and a runner apparatus secured to said shaft, said guide gate apparatus and said runner apparatus comprising:
a plurality of wicket gates arranged in a circular array around said central axis with said gates pivotal about pivot axes parallel to said central axis forming said guide gate apparatus, said gates each having a leading edge and a trailing edge with said trailing edge shaped to present a discharge angle which varies from a first end of said gate to a second end of said gate; and a plurality of runner blades forming said runner apparatus, said runner apparatus having an inlet and an exit, the shape of said runner blades being a function of the shape of said wicket gates such that a whirl value for fluid flow at substantially every point exiting said runner apparatus is between about zero and a value that is less than the change in whirl from said inlet to said exit of said runner apparatus.

22. The hydraulic turbine of claim 21 having a spiral casing and a stay ring with stay vanes arranged around said guide gate apparatus.

23. The hydraulic turbine of claim 22 having a draft tube.

* * * * *